(12) United States Patent
Ang et al.

(10) Patent No.: US 7,778,798 B2
(45) Date of Patent: Aug. 17, 2010

(54) SYSTEM AND METHOD FOR MEASURING TOOL PERFORMANCE

(75) Inventors: Swee Keng Ang, Singapore (SG); Hanif Bin Mohamed Mohamed, Singapore (SG); Joo Ming Jackson Tan, Singapore (SG)

(73) Assignee: Systems on Silicon Manufacturing Co. Pte. Ltd., Singapore (SG)

( * ) Notice: Subject to any disclaimer, the term of this patent is extended or adjusted under 35 U.S.C. 154(b) by 979 days.

(21) Appl. No.: 11/548,948

(22) Filed: Oct. 12, 2006

(65) Prior Publication Data

US 2008/0091382 A1 Apr. 17, 2008

(51) Int. Cl.
*G06F 11/30* (2006.01)

(52) U.S. Cl. .......... 702/182; 702/85; 702/183; 702/117; 702/155; 700/108; 700/121; 700/275; 713/322

(58) Field of Classification Search .......... 702/182, 702/85, 117, 155, 183; 700/108, 121, 275; 713/322
See application file for complete search history.

(56) References Cited

U.S. PATENT DOCUMENTS

| | | | | |
|---|---|---|---|---|
| 5,475,847 A * | 12/1995 | Ikeda | ................. | 713/322 |
| 6,374,195 B1 * | 4/2002 | Li et al. | ................. | 702/182 |
| 6,556,949 B1 * | 4/2003 | Lyon | ................. | 702/182 |
| 6,757,579 B1 * | 6/2004 | Pasadyn | ................. | 700/108 |
| 6,917,849 B1 * | 7/2005 | Pasadyn et al. | ................. | 700/121 |
| 6,952,656 B1 * | 10/2005 | Cordova et al. | ................. | 702/117 |
| 7,010,382 B2 * | 3/2006 | Cheng et al. | ................. | 700/121 |
| 7,047,101 B1 * | 5/2006 | Young et al. | ................. | 700/121 |
| 7,130,762 B2 * | 10/2006 | Hellig et al. | ................. | 702/182 |
| 7,546,177 B2 * | 6/2009 | Dierks et al. | ................. | 700/121 |
| 7,630,793 B2 * | 12/2009 | Thomas et al. | ................. | 700/275 |
| 2006/0058979 A1 * | 3/2006 | Markle et al. | ................. | 702/155 |
| 2009/0012730 A1 * | 1/2009 | Coss et al. | ................. | 702/85 |

* cited by examiner

*Primary Examiner*—Vijay B Chawan
(74) *Attorney, Agent, or Firm*—Rothwell, Figg, Ernst & Manbeck, P.C.

(57) ABSTRACT

A system and method for measuring tool performance of a multi-path cluster semiconductor fabrication tool. The system comprises a status data unit for receiving up or down status data for each element of the tool for respective operational time periods; a performance value assignment unit for assigning a performance value to the tool for each time period based on the status data of the elements during said each time period; and an operational uptime unit for determining an operational uptime for a period covering the time periods of the tool based on multiplying the respective time periods with the corresponding assigned performance values.

23 Claims, 9 Drawing Sheets

SYSTEM AND METHOD FOR MEASURING TOOL PERFORMANCE

FIELD OF INVENTION

The present invention relates broadly to a system and method for measuring tool performance of a multi-path cluster semiconductor fabrication tool, and to a data storage medium comprising computer code means for instructing a computer to execute a method of measuring tool performance of a multi-path cluster semiconductor fabrication tool.

BACKGROUND

In semiconductor fabrication, it is important to report on the performance of semiconductor fabrication tools in the various production processes. Systems for measuring tool performance typically receive as their input status data of respective tools, i.e. up or down status of the tool, production wafer output data, and data on the amount of wafers queuing and queuing time at the respective tools. The system processes the input data and typically outputs a number of performance evaluation charts, which in turn are used to identify potential performance problems, and generally in deciding various operating and production parameters in a semiconductor fabrication plant.

The charts typically include reports on actual wafer output, amount of queuing wafers and queuing time, tool ability or up time in percentage, and the efficiency of tools, each against time, typically in daily or weekly resolution. The charts can be provided for individual tools or for groups of tools associated with respective production processes in the plant. The information provided by the systems for measuring tool performance facilitates operation of the plant, e.g. a sudden surge in the amount of wafers queuing at a particular tool can indicate that the relevant tool is not performing, which in turn can lead to a loss in utilization of a bottleneck tool downstream from the effected tool. Another example is the information from uptime reports, i.e. reports on the tool availability for production as a percentage, where poor uptime is often responsible for poor overall tool performances. As another example, reports on the tool efficiency facilitates an assessment whether a tool is being fully utilized in a best possible way.

Amongst the different tools in a semiconductor fabrication plant, performance measurements of multi-path cluster tools have typically been performed based on an averaging analysis. Multi-path cluster tools are tools which consist of a number of production chambers or modules and interconnecting wafer conveyancing systems between the chambers or modules, and between load locks at the input and output stages. In multi-path cluster tools, wafers proceed on different Intended Process Paths (IPPs), in a parallel-series sequence of the respective modules or chambers.

One example of a multi-path cluster tool is a Metal Sputtering Tool (ATM) tool. For the ATM tool, Ti-pasting, which is a particle improvement activity, involves only two out of four available chambers within the tool. Inaccuracies arise in measuring tool performance using the average of the individual performance of the chambers. More particular, during Ti-pasting, the averaging method yields a 50% uptime for the multi-path cluster tool, with two out of four available chambers running, but practically all of the chambers, and therefore the multi-path cluster tool, are not available for production. Therefore, the performance measurement system analyses the tool based on an inaccurate, i.e. longer uptime, which in turn yields e.g. in a lower efficiency measurement for that tool, where the uptime is linked to the actual wafer output data for that tool.

To address this problem, in a modified existing performance measurement system and method, a simple truth table has been incorporated. More particular, the truth table is utilized to classify different combinations of status data for the respective chambers or modules of the multi-path cluster tool into a binary status for each IPP of the multi-path cluster tool. In other words, a knowledge based classification or truth table is utilized to identify an up or down status for each IPP of the multi-path cluster tool, and the overall performance of the multi-path cluster tool, in particular its overall operational uptime, is then calculated based on the binary status data for each IPP over respective operation time periods.

It has been recognized by the inventors that such modified performance measurement systems and methods can still result in inaccurate performance measurements for multi-path cluster tools. In particular, the binary status data obtained utilizing the classification or truth table does not account for non-binary characteristics of multi-path cluster tools recognized by the inventors.

A need therefore exists to provide a system and method for measuring tool performance of a multi-path cluster semiconductor fabrication tool that seeks to address the problem recognized by the inventors.

SUMMARY

In accordance with a first aspect of the present invention there is provided a system for measuring tool performance of a multi-path cluster semiconductor fabrication tool, the system comprising a status data unit for receiving up or down status data for each element of the tool for respective operational time periods; a performance value assignment unit for assigning a performance value to the tool for each time period based on the status data of the elements during said each time period; and an operational uptime unit for determining an operational uptime for a period covering the time periods of the tool based on multiplying the respective time periods with the corresponding assigned performance values.

The performance value for at least one time period may differ from n*100% divided by the number of process paths of the tool, where n=0, 1, 2, . . . .

The system may further comprise an efficiency unit for measuring an operational efficiency associated with the tool, wherein the efficiency unit receives production wafer output data over said time periods; receives control wafer output data over a test time period preceding or following said time periods; and measures the operational efficiency based on a sum of the production wafer output and the control wafer output.

The operational efficiency may be calculated as:

$$\text{Efficiency} = \frac{(ActualOuts + CW)/(MainRunTime + MainTestTime)}{(revTheoreticalOuts)/(MainRunTime + MainTestTime)/OpUptime)}$$

where ActualOuts is a production wafer output, CW is a control wafer throughput, MainRunTime is the time for production wafer output, MainTestTime is the time for control wafer throughput, revTheoreticalOuts is equal to a wafers per hour (WPH) value multiplied by (MainRunTime+MainTestTime), and OpUptime is the operational uptime of the tool in percent.

The operational uptime unit may further measure an operational uptime of a group of tools associated with a production process.

The operational uptime unit may determine an average of the operational uptimes of primary tools in the group of tools, determines a normalised operational uptime of an incoming backup tool in the group of tools, and calculates the operational uptime of the group of tools associated with the production process based on the average of the operational uptimes of the primary tools and the normalized uptime of the incoming backup tool.

The operational uptime of the group of tools associated with the production process may be calculated as the sum of the average of the operational uptimes of the primary tools and the normalized uptime of the backup tool.

The normalized operational uptime of the incoming backup tool may be calculated by dividing a measured operational uptime of the incoming backup tool by the number of primary tools in the group of tools.

The operational uptime unit may determine an average of the operational uptimes of remaining primary tools in the group of tools, determines a normalized operational uptime of one primary tool of the group which is outgoing as a backup tool for another production process, and calculates the operational uptime of the group of tools associated with a production process based on the average of the operational uptimes of the primary tools and the normalized uptime of said one primary tool.

The operational uptime of the group of tools associated with the production process may be calculated as the sum of the average of the operational uptimes of said remaining primary tools and the normalized uptime of said one tool.

The normalized uptime of said one tool may be calculated by dividing a measured operational uptime for said one tool by the number of said remaining primary tools in the group.

In accordance with a second aspect of the present invention there is provided a method of measuring tool performance of a multi-path cluster semiconductor fabrication tool, the method comprising the steps of determining up or down status data for each element of the tool for respective operational time periods; assigning a performance value to the tool for each time period based on the status data of the elements during said each time period; determining an operational uptime for a period covering the time periods of the tool based on multiplying the respective time periods with the corresponding assigned performance values; and applying the determined operational uptime in selecting operational parameters, production parameters, or both, of a semiconductor production plant.

The performance value for at least one time period may differ from n*100% divided by the number of process paths of the tool, where n=0, 1, 2, . . . .

The method may further comprise the step of measuring an operational efficiency associated with the tool, the step of measuring the operational efficiency comprising determining production wafer output over said time periods; determining a control wafer output over a test time period preceding or following said time periods; and measuring the operational efficiency based on a sum of the production wafer output and the control wafer output.

The operational efficiency may be calculated as $$\text{Efficiency} = \frac{(ActualOuts + CW)/(MainRunTime + MainTestTime)}{(revTheoreticalOuts)/(MainRunTime + MainTestTime)/OpUptime)}$$

where ActualOuts is a production wafer output, CW is a control wafer throughput, MainRunTime is the time for production wafer output, MainTestTime is the time for control wafer throughput, revTheoreticalOuts is equal to a wafers per hour (WPH) value multiplied by (MainRunTime+MainTestTime), and OpUptime is the operational uptime of the tool in percent.

The method may further comprise the step measuring an operational uptime of a group of tools associated with a production process.

The step of measuring the operational uptime of the group of tools may comprise determining an average uptime of the operational uptimes of primary tools in the group of tools; determining a normalised operational uptime of an incoming backup tool in the group of tools; and calculating the operational uptime of the group of tools associated with the production process based on the average of the operational uptimes of the primary tools and the normalized uptime of the incoming backup tool.

The operational uptime of the group of tools associated with the production process may be calculated as the sum of the average of the operational uptimes of the primary tools and the normalized uptime of the backup tool.

The normalized operational uptime of the incoming backup tool may be calculated by dividing a measured operational uptime of the incoming backup tool by the number of primary tools in the group of tools.

The step of measuring the operational uptime of the group of tools may comprise determining an average uptime of the operational uptimes of remaining primary tools in the group of tools; determining a normalized operational uptime of one primary tool of the group which is outgoing as a backup tool for another production process; and calculating the operational uptime of the group of tools associated with a production process based on the average of the operational uptimes of the primary tools and the normalized uptime of said one primary tool.

The operational uptime of the group of tools associated with the production process may be calculated as the sum of the average of the operational uptimes of said remaining primary tools and the normalized uptime of said one tool.

The normalized uptime of said one tool may be calculated by dividing a measured operational uptime for said one tool by the number of said remaining primary tools in the group.

In accordance with a third aspect of the present invention there is provided a data storage medium comprising computer code means for instructing a computer to execute a method of measuring tool performance of a multi-path cluster semiconductor fabrication tool, the method comprising the steps of determining up or down status data for each element of the tool for respective operational time periods; assigning a performance value to the tool for each time period based on the status data of the elements during said each time period; determining an operational uptime for a period covering the time periods of the tool based on multiplying the respective time periods with the corresponding assigned performance values; and applying the determined operational uptime in selecting operational parameters, production parameters, or both, of a semiconductor production plant.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
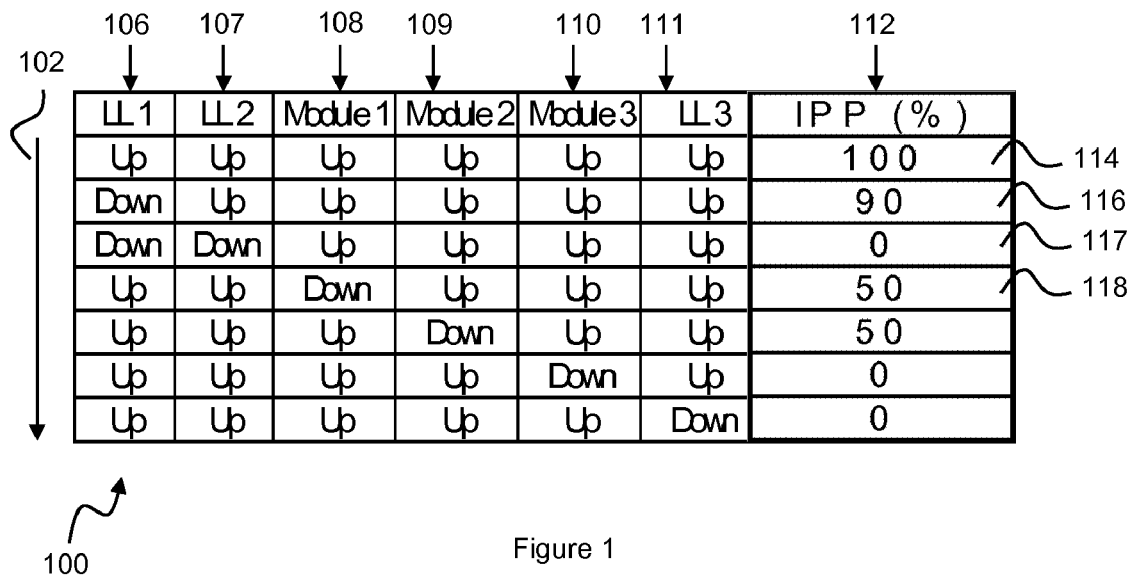
FIG. 1 shows a classification table illustrating the assigning of percentage performance values to a multi-path cluster semiconductor fabrication tool.

The system and method for measuring tool performance of a multi-path cluster semiconductor fabrication tool described herein replace the binary status classification for individual IPPs of the multi-path cluster tool with an assigned percentage performance value for the tool based on binary status data of the individual elements of the multi-path cluster tool.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "measuring", "calculating", or the like, refer to the action and processes of a computer system, or similar electronic device, that manipulates and transforms data represented as physical quantities within the the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in a Bluetooth communication system. The computer program when loaded and executed on such a general-purpose computer effectively results in an apparatus that implements the steps of the preferred method.

FIG. 1 shows a classification Table 100 illustrating the assigning of percentage performance values to a multi-path cluster semiconductor fabrication tool for different time periods along a time axis 102, each time period associated with one row of the Table 100. Columns 106 to 111 show the binary status data for the respective elements of the multi-path cluster tool in the respective time periods. Column 112 lists the respective percentage performance values assigned to the tool for the respective time periods, based on the binary status data of the respective elements in columns 106 to 111. For example, in cell 114 a 100% performance value has been assigned for the multi-path cluster tool based on the binary status data being "up" for all elements.

In cell 116, a 90% performance value has been assigned, where one of the load locks (LL1) has a "down" binary status for the relevant time period (compare column 106). Thus, the percentage performance values assigned in column 112 include performance values which differ from integer n multiples, n=0, 1, 2, . . . , of 100% divided by the number of process paths of the multi-path cluster tool. This can advantageously provide a more accurate assessment of the operational uptime of the multi-path cluster fabrication tool.

Figure 2:
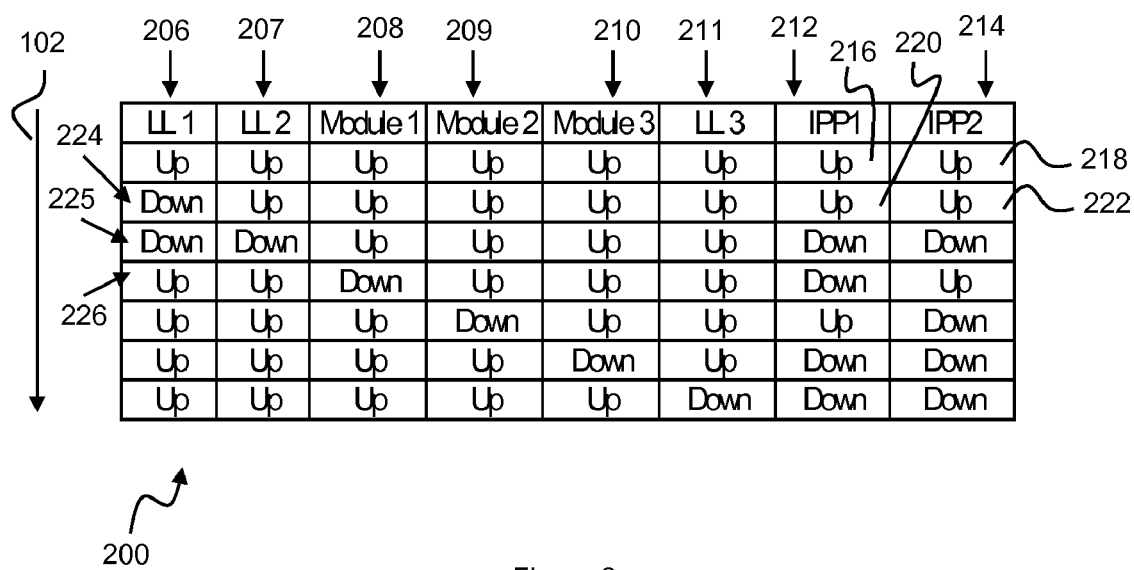
FIG. 2 shows an existing classification table used in existing performance measurement systems and methods for the same tool as in FIG. 1.

For comparison, FIG. 2 shows a truth table-based classification Table 200 used in existing performance measurement systems and methods for the same tool. In Table 200, columns 206 to 211 list the same binary status data for the respective elements of the multi-path cluster tool for respective operation time periods along the same time axis 102, with each row e.g. 204 associated with one operation time period. In Table 200, columns 212 and 214 list the binary status data assigned for the two IPPs, IPP1 and IPP2, respectively. For example, cells 216 and 218 illustrate assigning of an "up" status to both IPP1 and IPP2 for a time period where all of the elements in columns 206 to 211 have an "up" status. Significantly, in cells 220 and 222 an "up" status has also been assigned for the time period where one of the load locks, LL1 has a "down" status (compare column 206). This assignment is based on the practical "knowledge or truth" that the other load locks LL2, can be used to load wafers for both IPP1 and IPP2 of the multi-path cluster tool. Therefore, the binary status of "up" is assigned to both IPP1 and IPP2 in the existing measurement system and method.

However, the inventors have recognized that the binary status assignment in the existing classification Table 200 does not accurately reflect the actual knowledge available for particular multi-path cluster tools. For example, even though the other load lock LL2, can be used to load wafers for both IPP1 and IPP2, a performance penalty is still incurred due to additional equipment movement required in implementing a single load lock entry into the multi-path cluster tool, in particular additional transfer arm movement with respect to wafer cassettes. Returning now to FIG. 1, in the classification Table 100 a percentage performance value of "only" 90% has thus been assigned in cell 116, for the corresponding time period. The operational uptime for the period covered by e.g. cells 116 to 118 is calculated as follows:

(90%*10 hours)+(0%*8 hours)+(50%*6 hours)/24 hours=50%     (1)

assuming a length of the relevant periods of 10 hours, 8 hours and 6 hours respectively.

In contrast, and with reference to FIG. 2, the operational uptime for the same period (rows 224-226) based on the existing classification Table 200 would be calculated as follows:

(10 hours ["up" status $IPP1$]+16 hours["up" status $IPP2$])/48=54.2%     (2)

As can be seen from a comparison between equations (1) and (2), the operational uptime measured utilizing Table 100 (FIG. 1) provides a reduced operational uptime which reflects the above mentioned time penalty practically incurred, whereas this time penalty is not captured in existing systems and methods based on the classification Table 200 (FIG. 2) utilizing the binary status assignment for each IPP of the multi-path cluster tool. In embodiments of the present invention, systems and methods for performance measurement of multi-path cluster tools based on the classification Table 100 can therefore advantageously provide more accurate operational uptime data.

Accurate operational uptime data is important in the assessment of tool performance in a semiconductor fabrication plant. For example, the efficiency of a tool is typically determined as follows:

$$\text{Efficiency} = \frac{ActualOuts / MainRunTime}{TheoreticalOuts / (MainRunTime / OpUptime)}, \quad (3)$$

where ActualOuts is the production wafer output, MainRunTime is the time for production wafer output, TheoreticalOuts is equal to the theoretical wafers per hour (WPH) value multiplied by MainRunTime, and OpUptime is the operational uptime.

As can be seen from equation (3), inaccurate operational uptime data therefore leads to inaccurate efficiency data.

In example embodiments, a further modification compared to existing systems and methods for performance measurement of tools is implemented in relation to the calculation of the tool efficiency. More particular, in the existing calculation according to equation (3), no account is made of control wafer through put, including zero wafer through put. Such wafers are used to monitor the process quality of a tool, in particular before release to run production, and may typically be performed every 24 hours. In the existing systems and methods based on equation (3), these wafers are not included in the efficiency calculation. However, it has been recognized by the inventors that this leads to inaccurate efficiency calculations, which can unduly penalize the assessment of operators of the relevant tool. Therefore, a modified formula for calculating efficiency is implemented in example embodiments as follows:

$$\text{Efficiency} = \frac{(ActualOuts + CW) / (MainRunTime + MainTestTime)}{(revTheoreticalOuts) / (MainRunTime + MainTestTime) / OpUptime)} \quad 4)$$

where CW is the control wafer throughput, MainTestTime is the time for control wafer throughput, revTheoreticalOuts is equal to the WPH value multiplied by (MainRunTime+MainTestTime).

Figure 3A:
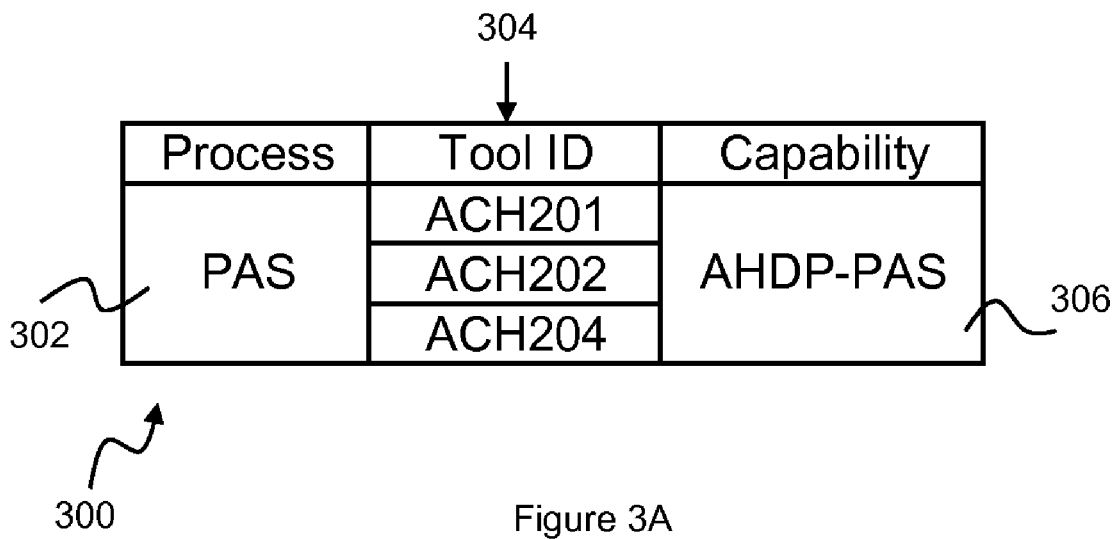
FIGS. 3A and 3B show tables illustrating respective groupings of tools for different processes.
Figure 3B:
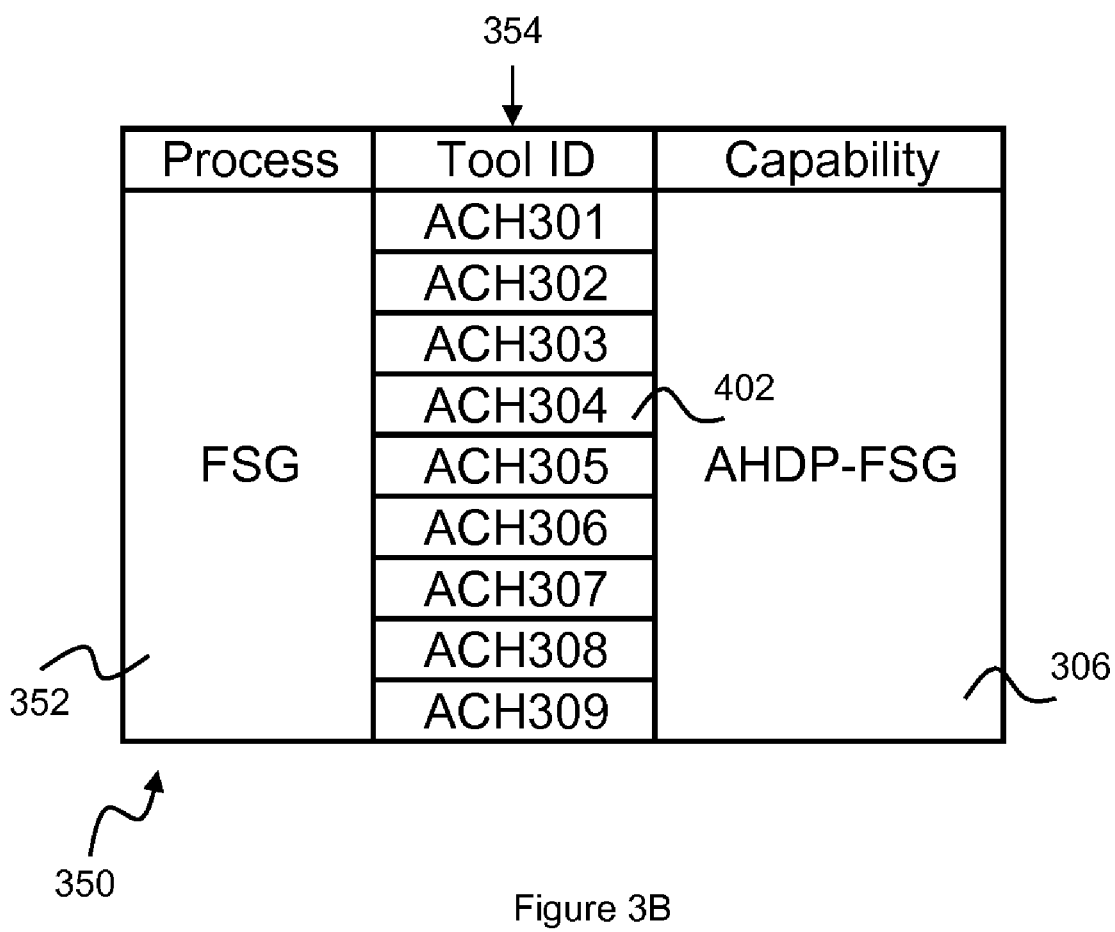

Another modification in example embodiments compared to existing systems and methods will now be described. Process backup is used frequently in semiconductor fabrication plants. Process backup can optimize capacity for a limited tool investment, where each tool is typically assigned as one of the primary tools for a particular process. FIGS. 3A and 3B show Tables 300 and 350 respectively, each Table 300, 350 illustrating a grouping of tools for a particular process. More particular, in Table 300, a Passivation (PAS) process (cell 302) has three primary tools listed in column 304. Cell 306 identifies the relevant capability associated with the process, A-High Density Plasma (AHDP)-PAS. Similarly, in Table 350 cell 352 identifies a Fluorinated Silicate Glass (FSG) process with eight primary tools listed in column 354, and cell 356 identifying the process capabilities, i.e. AHDP-FSG.

In a process backup scenario, the tool capability can be used as an identifier to switch between processes for a particular tool. In this manner, the reporting system and method can capture and trigger changes to reflect a more accurate uptime calculation when switches occur, as will be described in more detail below.

Figure 4A:
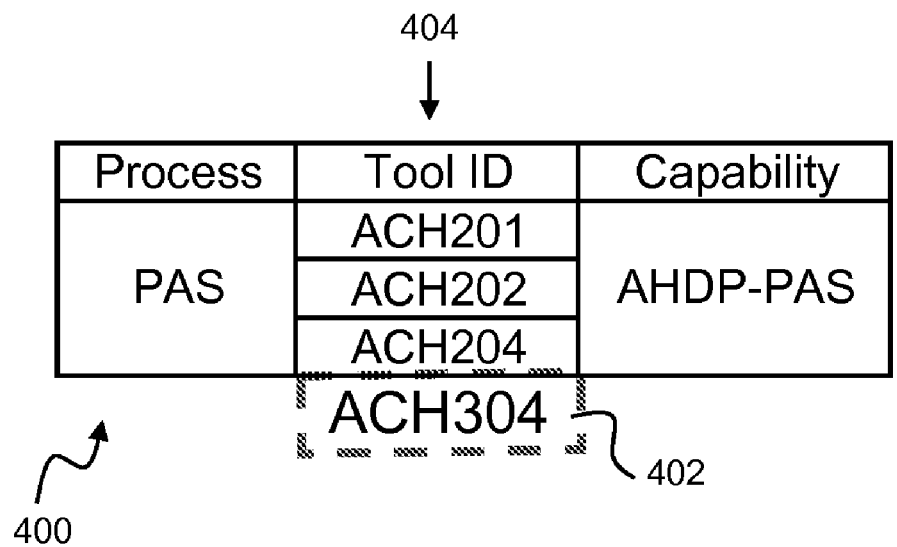
FIG. 4A shows a table illustrating an incoming backup tool grouping table for the process of FIG. 3A.
Figure 4B:
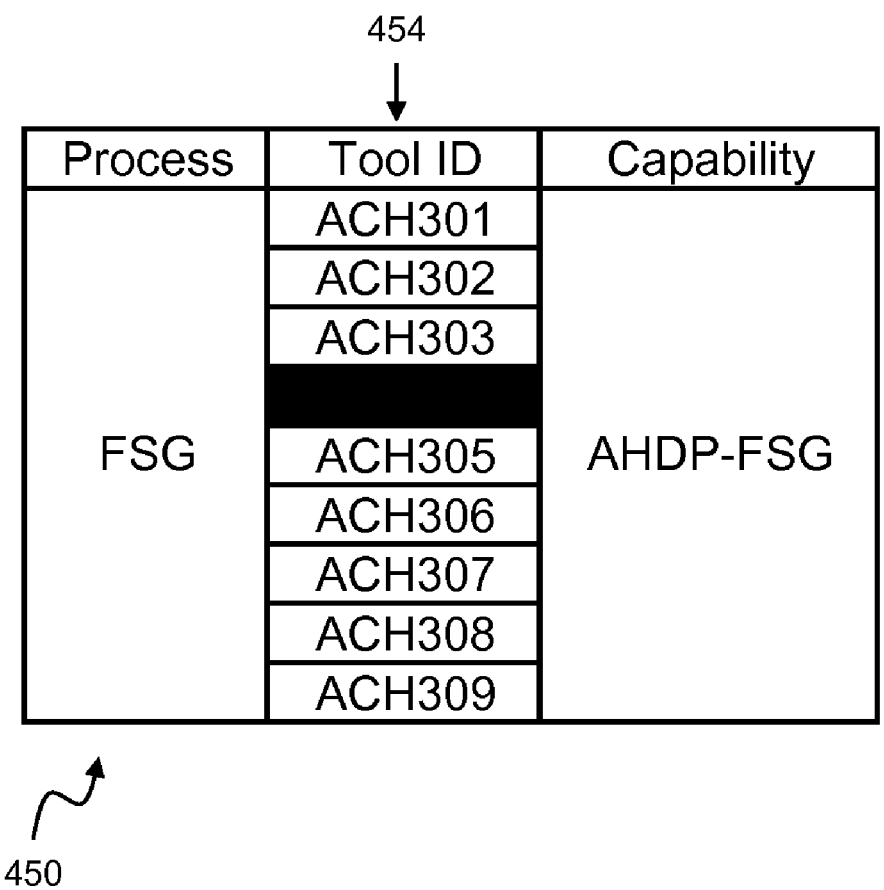
FIG. 4B shows a table illustrating an outgoing backup process tool grouping for the process of table 3B.

FIGS. 4A and 4B show an illustration of a backup process illustrated in modified Tables 400 and 450 respectively. More particular, one of the primary tools 402 of process Table 350 (FIG. 3B) has been switched to the modified process Table 300 (FIG. 3A), resulting in the modified process Tables 400 and 450. In other words, in the backup scenario, there are now four tools operating under the PAS process (compare column 404), whereas only eight of the originally nine primary tools are remaining under the SSG process (compare column 454).

Figure 5:
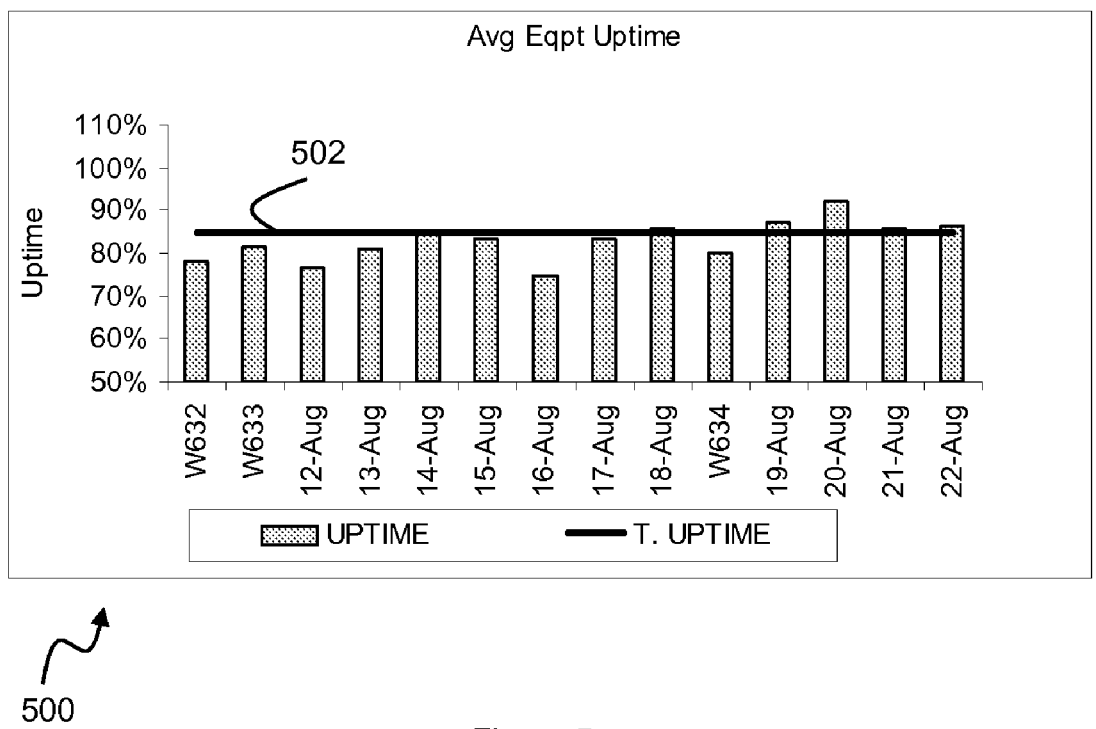
FIG. 5 shows a conventional chart of operational uptime versus time periods for the incoming backup process of FIG. 4A.
Figure 6:
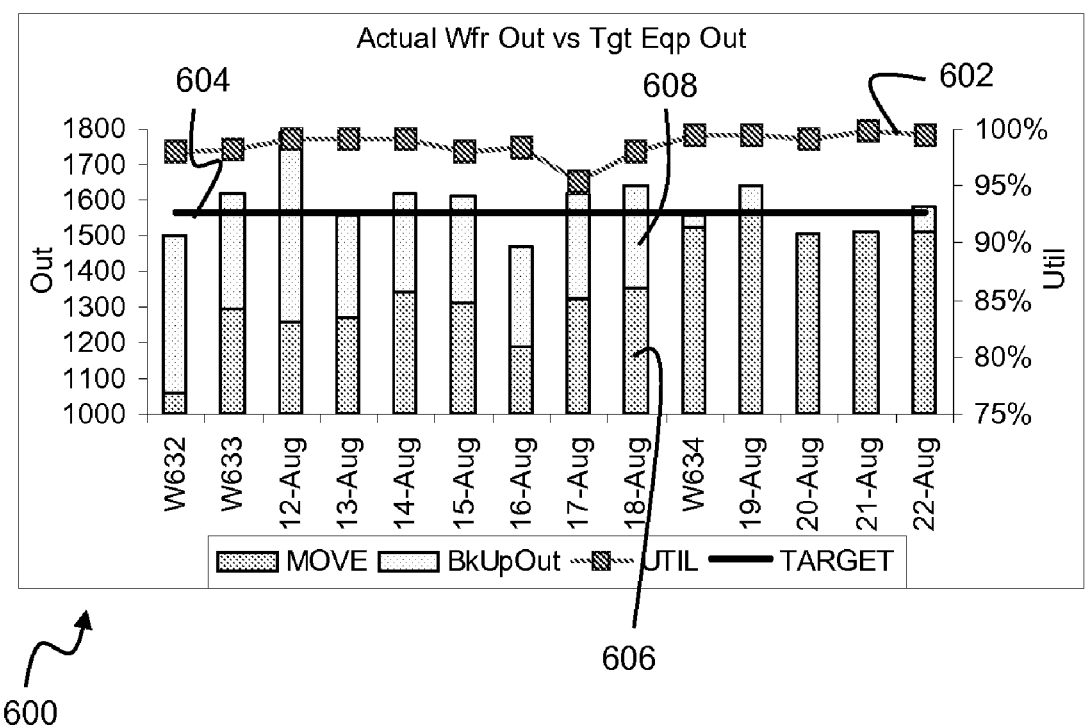
FIG. 6 shows a chart of actual wafer out as a function of time periods for the incoming backup process of FIG. 4A.

Turning initially to the PAS process having the incoming backup, in existing systems and methods, the relevant PAS operational uptime for the group of tools is calculated as the average of the operational uptimes of the four tools listed in column 404 (FIG. 4A). FIG. 5 shows an example resulting chart 500 of operational uptime versus time periods. Curve 502 indicates a targeted uptime for the relevant process. FIG. 6 shows a chart 600 of actual wafer out for process PAS as a function of the same time periods, together with a utilization value for the same time periods (curve 602). Also shown is the target actual wafer out, curve 604. Comparing the charts shown in FIGS. 5 and 6, it will be appreciated that while in chart 500 (FIG. 5), for instance on 18 August, the uptime meets the target, the primary wafer output, indicated as the filled bar portion 606 in chart 600 (FIG. 6), does not meet the target. Rather, the wafer output has to depend on backup output, indicated as the unfilled bar portion 608 in chart 600 (FIG. 6) to meet the shortfall. Thus, interpreting charts 500 and 600 can result in contradicting or different messages being conveyed.

Figure 7:
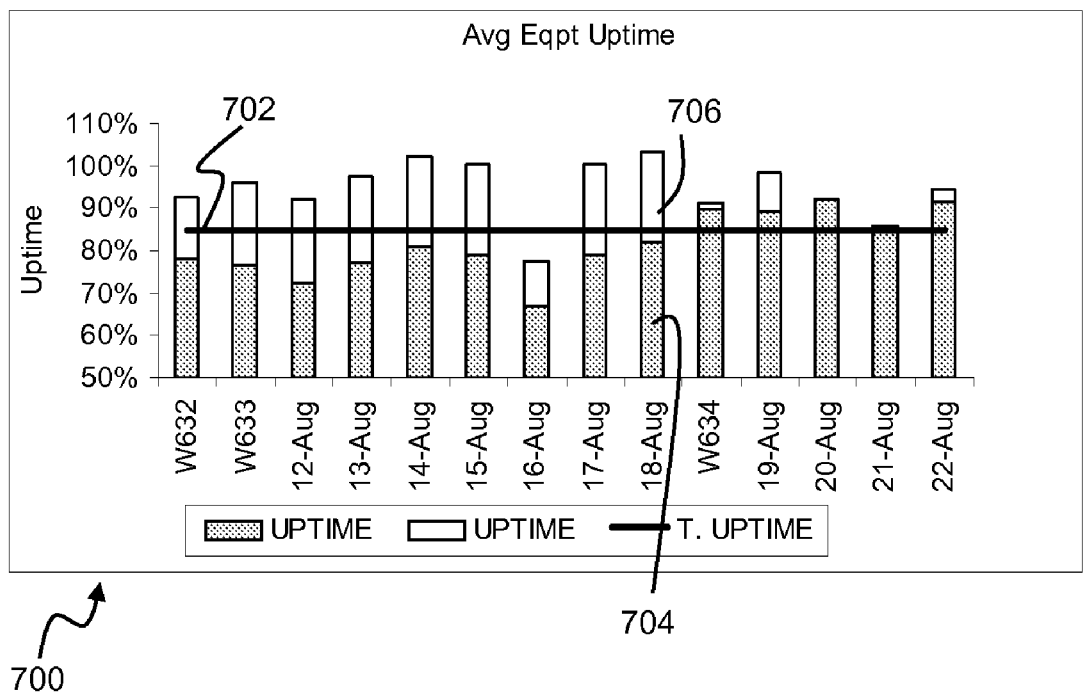
FIG. 7 shows a chart of operational uptime versus time period for the outgoing backup process of FIG. 4B according to an example embodiment.

FIG. 7 shows a chart 700 illustrating the modified operational uptime in example embodiments, for the same time periods. Again, curve 702 shows the targeted uptime. In the modified implementation, the operational uptime for the group of tools associated with the PAS process (compare column 404 in FIG. 4A) is calculated based on the sum of an average uptime of the primary tools ACH 201, ACH 202, and ACH 204 (FIG. 4A) and a normalized operational uptime of the incoming backup tool ACH 304. More particular, the normalized operational uptime for the incoming backup tool ACH 304 is calculated based on the measured uptime for the incoming backup tool ACH 304, divided by the number of primary tools in the group associated with the PAS process, i.e. three in the example illustrated in FIG. 4A.

In the chart 700 shown in FIG. 7, e.g. the bar for 18 August correspondingly consists of a filled bar portion 704 corresponding to the average uptime of the three primary tools, and a non-filled bar portion 706 corresponding to the normalized uptime of the incoming backup tools. Therefore, advantageously, a comparison of chart 700 of FIG. 7 and chart 6 of FIG. 6 now conveys a consistent message. Both charts indicate that the primary tools (filled bar portions 606, 704) in both charts do not meet the target, while together with the backup tool (compare non-filled bar portions 608, 706) the target is exceeded.

Figure 8:
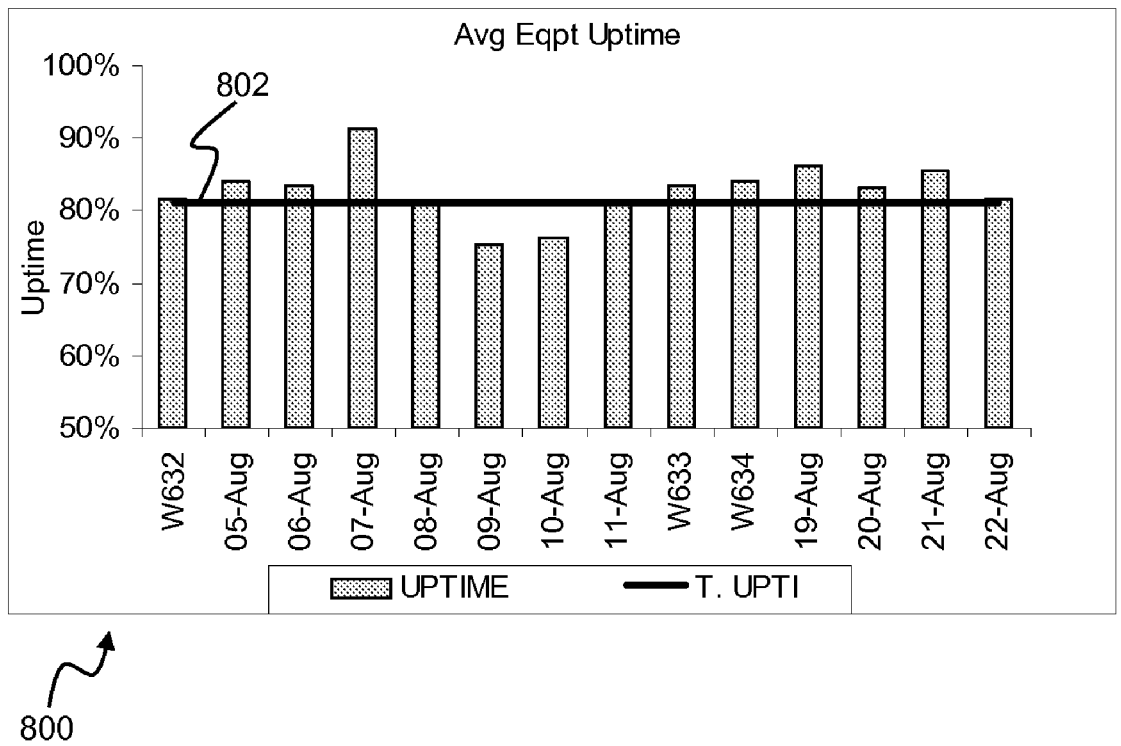
FIG. 8 shows a conventional chart of operational uptime versus time periods for the incoming backup process of FIG. 4B.
Figure 9:
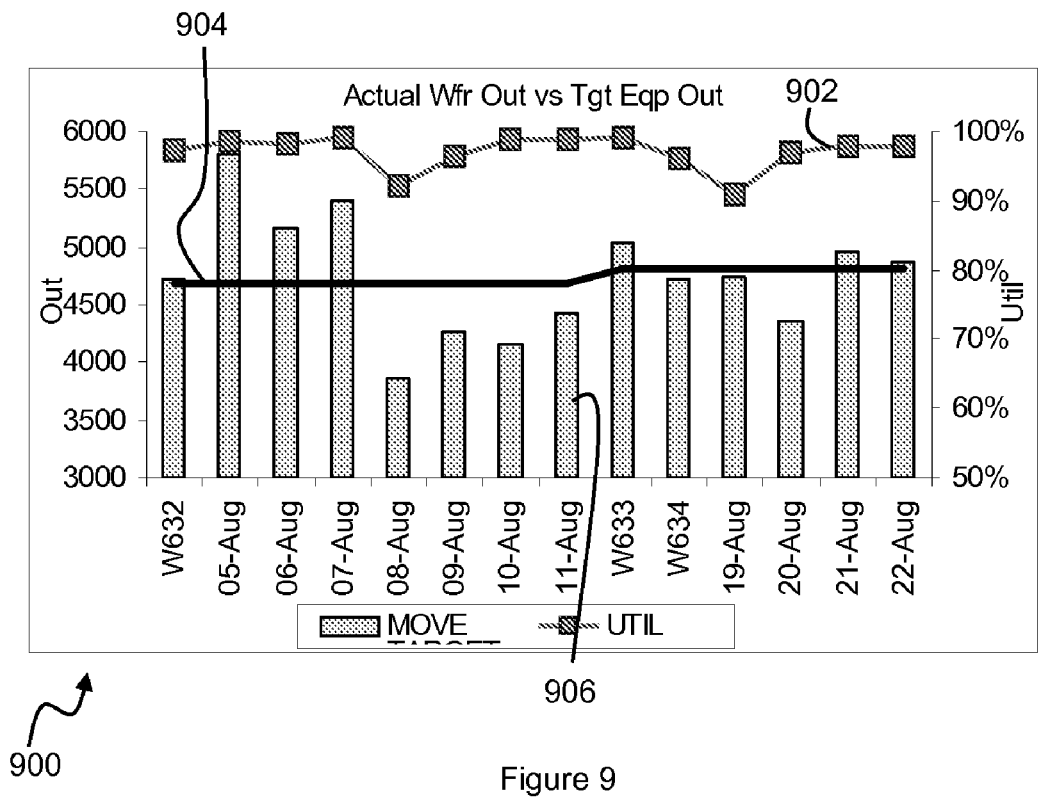
FIG. 9 shows a chart of actual wafer out as a function of time periods for the incoming backup process of FIG. 4B.

Turning now to the FSG process having the outgoing backup, in existing systems and methods, the relevant FSG operational uptime for the group of tools is calculated as the average of the operational uptimes of the eight original primary tools listed in column 354 (FIG. 3B). FIG. 8 shows an example resulting chart 800 of operational uptime versus time periods. Curve 802 indicates a targeted uptime for the relevant process. FIG. 9 shows a chart 900 of actual wafer out for process FSG as a function of the same time periods, together with a utilization value for the same time periods (curve 902). Also shown is the target actual wafer out, curve 904. Comparing the charts shown in FIGS. 8 and 9, it will be appreciated that while in chart 800 (FIG. 8), for instance on 11 August, the uptime meets the target, the primary wafer output, indicated as the bar 906 in chart 900 (FIG. 9), does not meet the target. Thus, interpreting charts 800 and 900 can result in contradicting or different messages being conveyed.

Figure 10:
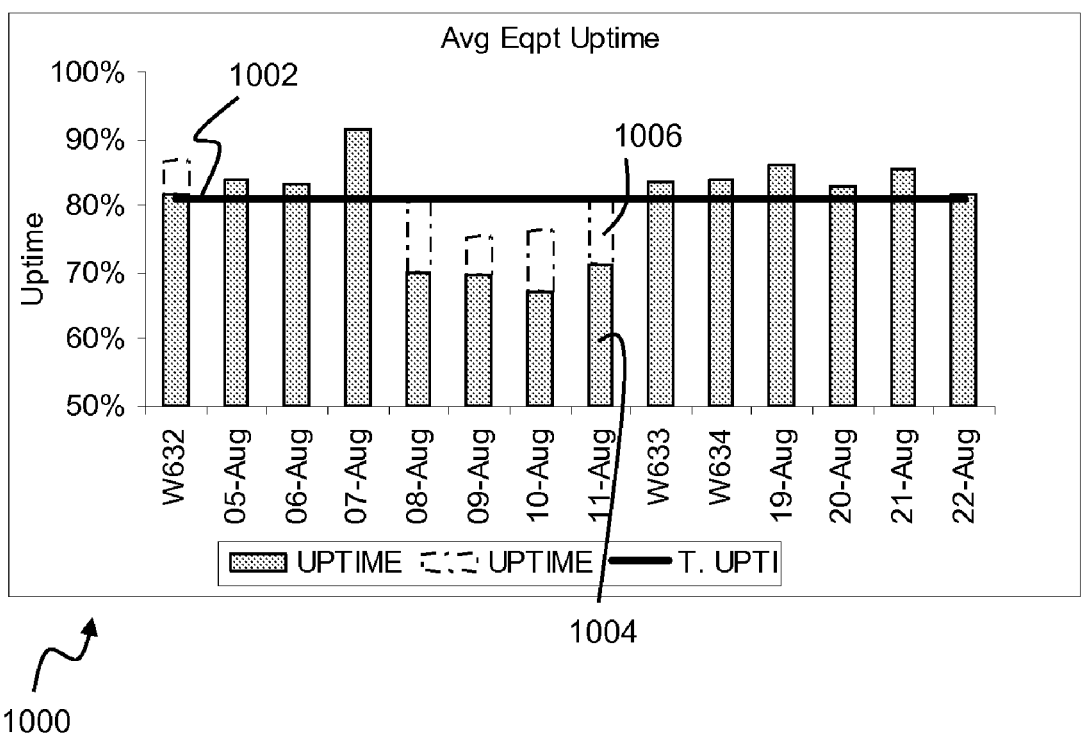
FIG. 10 shows a chart of operational uptime versus time period for the outgoing backup process of FIG. 4B according to an example embodiment.

FIG. 10 shows a chart 1000 illustrating the modified operational uptime in example embodiments, for the same time periods. Again, curve 1002 shows the targeted uptime. In the modified implementation, the operational uptime for the group of tools associated with the FSG process under the outgoing backup scenario (compare column 454 in FIG. 4B) is calculated based on the sum of an average uptime of the remaining primary tools ACH 301, ACH 302, ACH 303, ACH 305, ACH 306, ACH 307, and ACH 308 (FIG. 4B), and a normalized operational uptime of the outgoing backup tool ACH 304 (FIG. 4A). More particular, the normalized operational uptime for the outgoing backup tool ACH 304 is calculated based on the measured uptime for the outgoing backup tool ACH 304, divided by the number of remaining primary tools in the group associated with the FSG process, i.e. seven in the example illustrated in FIG. 4B.

In the chart 1000 shown in FIG. 10, e.g. the bar for 11 August correspondingly consists of a filled bar portion 1004 corresponding to the average uptime of the seven remaining primary tools, and a non-filled bar portion 1006 corresponding to the normalized uptime of the outgoing backup tool. Therefore, advantageously, a comparison of chart 1000 of FIG. 10 and chart 9 of FIG. 9 now conveys a consistent message. Both charts indicate that the remaining primary tools (bar 906, filled bar portion 1004) in both charts do not meet the target.

Figure 11:
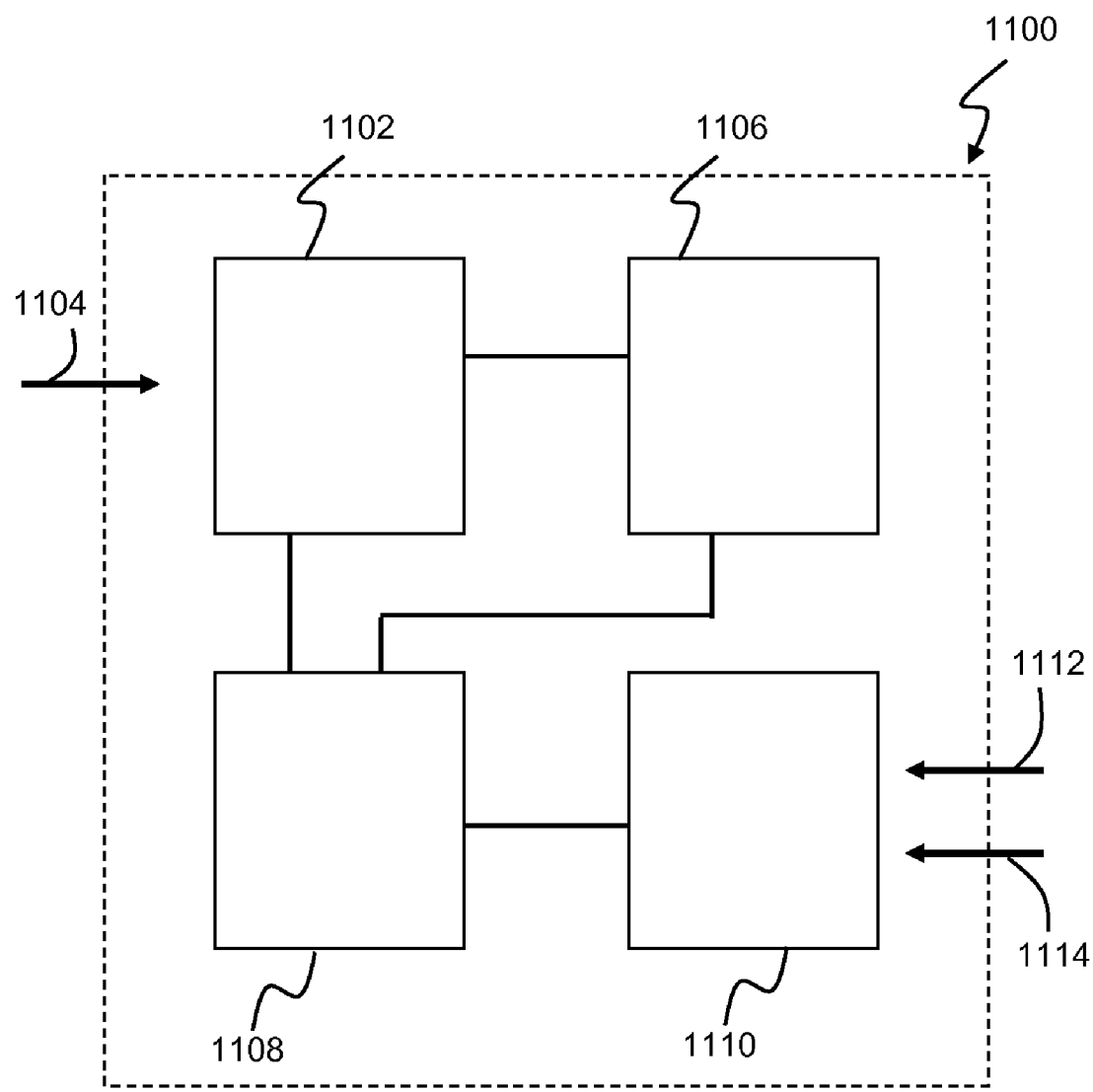
FIG. 11 shows a schematic drawing of a system 1100 for measuring tool performance of a multi-path cluster semiconductor fabrication tool in an example embodiment.

FIG. 11 shows a schematic drawing of a system 1100 for measuring tool performance of a multi-path cluster semiconductor fabrication tool in an example embodiment. The system 1100 comprises a status data unit 1102 for receiving up or down status data 1104 for each element of the tool for respective operational time periods, and a performance value assignment unit 1106 coupled to the status data unit 1102 for assigning a performance value to the tool for each time period based on the status data of the elements during said each time period. An operational uptime unit 1108 for determining an operational uptime for a period covering the time periods of the tool based on multiplying the respective time periods with the corresponding assigned performance values is coupled to the status data unit 1102 and the performance value assignment unit 1106.

The system 1100 further comprises an efficiency unit 1110 for measuring an operational efficiency associated with the tool. The efficiency unit 1110 receives production wafer output data 1112 over said time periods; receives control wafer output data 1114 over a test time period preceding or following said time periods; and measures the operational efficiency based on a sum of the production wafer output and the control wafer output. The efficiency unit 1110 is coupled to the operational uptime unit 1108.

In the described example, the data from the actual tools are fed into the respective units of the system 1100 in real-time. The reports are generated once every 24 hours. The system 1100 hence arranges and filters large amounts of real-time data to form meaningful reports to the user.

Figure 12:
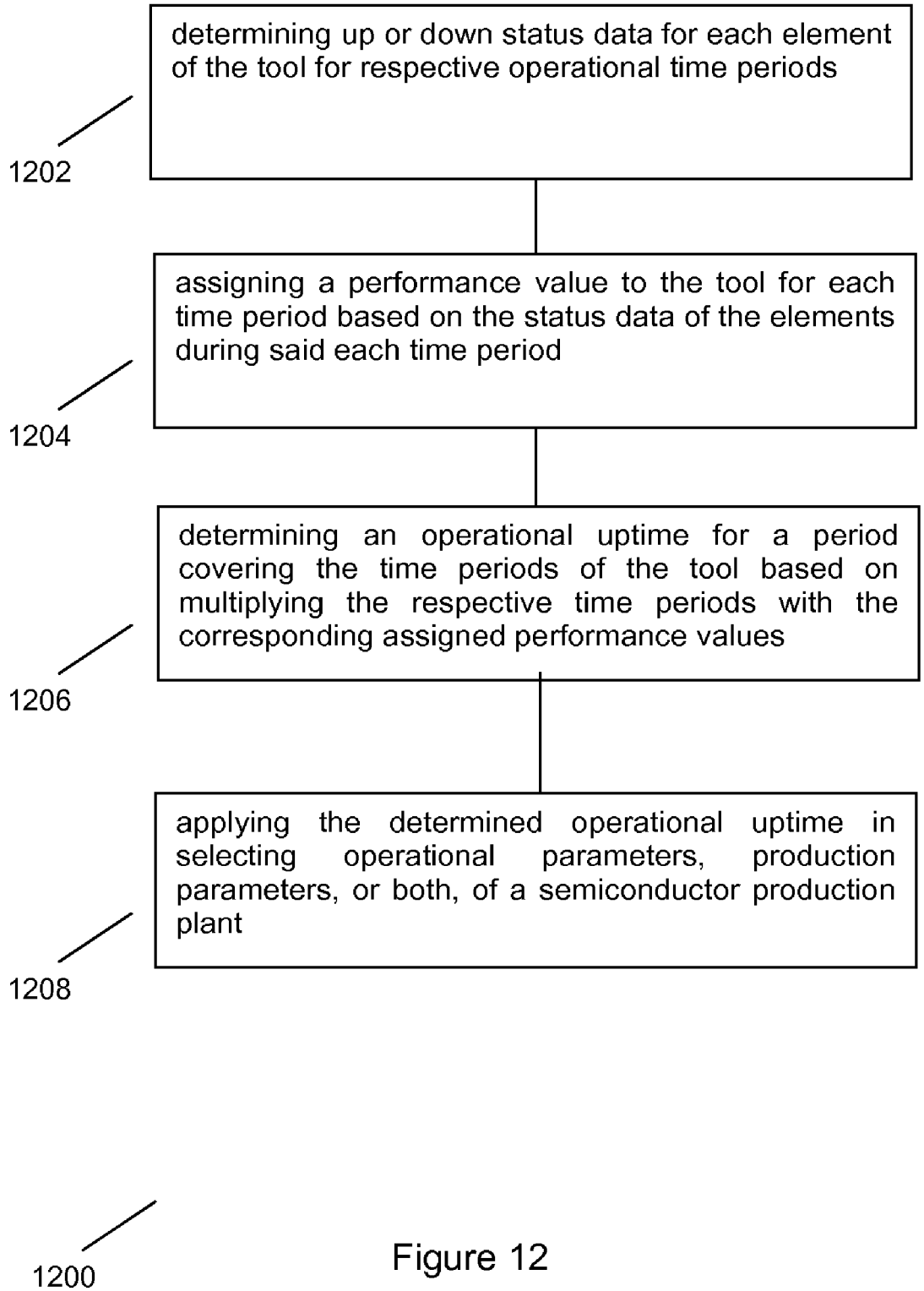
FIG. 12 shows a flowchart 1200 illustrating a method of measuring tool performance of a multi-path cluster semiconductor fabrication tool in an example embodiment.

FIG. 12 shows a flowchart 1200 illustrating a method of measuring tool performance of a multi-path cluster semiconductor fabrication tool in an example embodiment. At step 1202, up or down status data is determined for each element of the tool for respective operational time periods. At step 1204, a performance value is assigned to the tool for each time period based on the status data of the elements during said each time period. At step 1206, an operational uptime is determined for a period covering the time periods of the tool based on multiplying the respective time periods with the corresponding assigned performance values. At step 1208, the determined operational uptime is applied in selecting operational parameters, production parameters, or both, of a semiconductor production plant.

Figure 13:
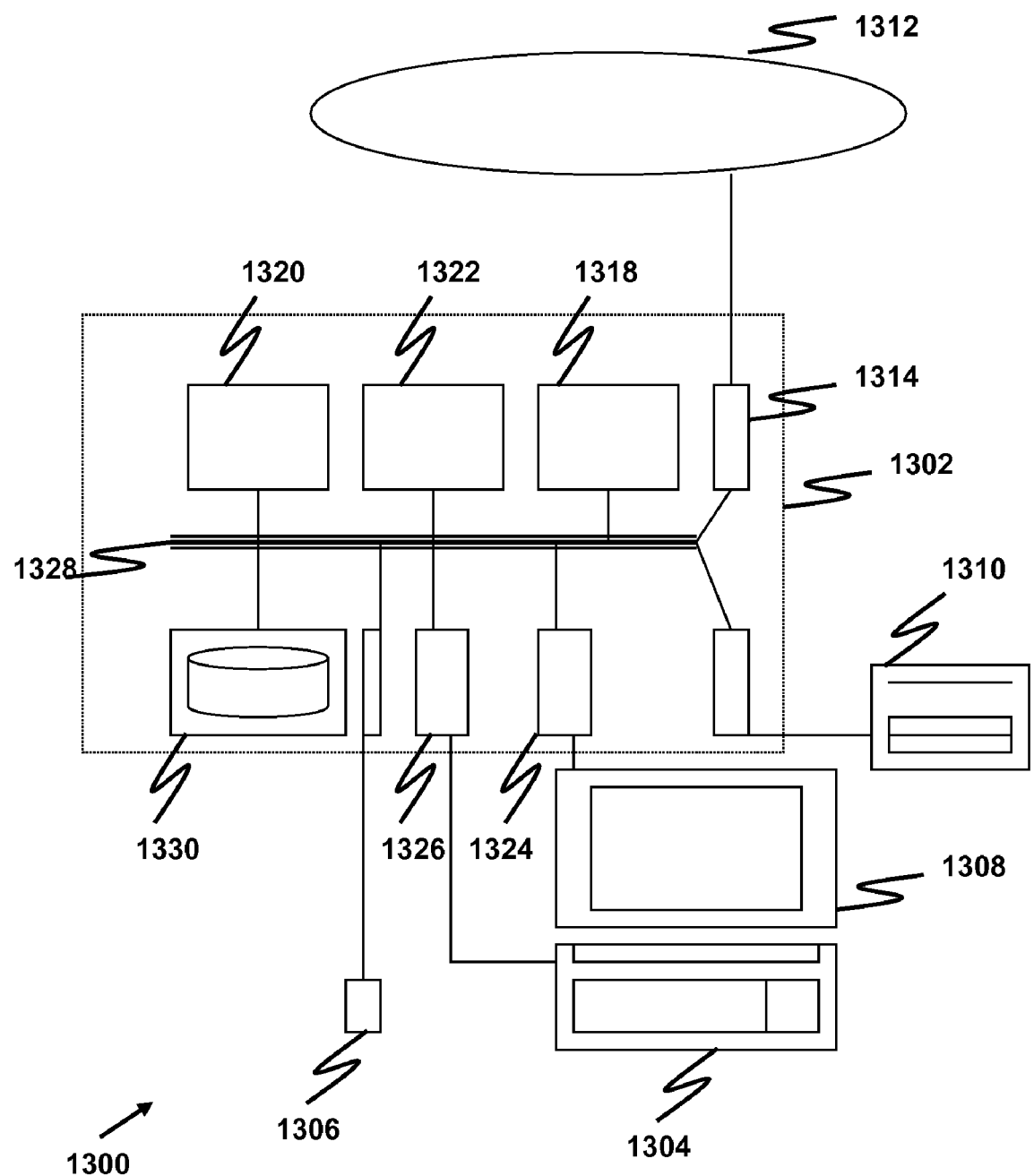
FIG. 13 is a schematic drawing of a computer system for implementing the described methods and systems.

The method and system of the example embodiment can be implemented on a computer system 1300, schematically shown in FIG. 13. It may be implemented as software, such as a computer program being executed within the computer system 1300, and instructing the computer system 1300 to conduct the method of the example embodiment.

The computer system 1300 comprises a computer module 1302, input modules such as a keyboard 1304 and mouse 1306 and a plurality of output devices such as a display 808, and printer 1310.

The computer module 1302 is connected to a computer network 1312 via a suitable transceiver device 1314, to enable access to e.g. the Internet or other network systems such as Local Area Network (LAN) or Wide Area Network (WAN).

The computer module 1302 in the example includes a processor 1318, a Random Access Memory (RAM) 1320 and a Read Only Memory (ROM) 1322. The computer module 1302 also includes a number of Input/Output (I/O) interfaces, for example I/O interface 1324 to the display 1308, and I/O interface 1326 to the keyboard 1304.

The components of the computer module 1302 typically communicate via an interconnected bus 1328 and in a manner known to the person skilled in the relevant art.

The application program is typically supplied to the user of the computer system 1300 encoded on a data storage medium such as a CD-ROM or flash memory carrier and read utilizing a corresponding data storage medium drive of a data storage device 1330. The application program is read and controlled in its execution by the processor 1318. Intermediate storage of program data may be accomplished using RAM 1320.

The described methods and systems in example embodiments can allow better assessment of tool performances in terms of recovery to support line linearity and Wafer Out values. The variable performance value can lead to a high degree of precision in uptime & efficiency reporting, particularly in a multi-path cluster tool. The backup uptime measures in example embodiments provide the availability as a result a backup action, and can facilitate to identify under/over allocation of backup capacity, and provide a clear segregation of outputs from additional backup. The described methods and systems in example embodiments can serve as a check to avoid unnecessary capital investment in operation of a semiconductor production plant.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for measuring tool performance of a multi-path cluster semiconductor fabrication tool, the system comprising:
   a status data unit for receiving up or down status data for each element of the tool for respective operational time periods;
   a performance value assignment unit for assigning a performance value to the tool for each time period based on the status data of the elements during said each time period; and
   an operational uptime unit for determining an operational uptime for a period covering the time periods of the tool based on multiplying the respective time periods with the corresponding assigned performance values.

2. The system as claimed in claim 1, wherein the performance value for at least one time period differs from n*100% divided by the number of process paths of the tool, where n=0,1,2, . . . .

3. The system as claimed in claim 1, further comprising an efficiency unit for measuring an operational efficiency associated with the tool, wherein the efficiency unit receives production wafer output data over said time periods; receives control wafer output data over a test time period preceding or following said time periods; and measures the operational efficiency based on a sum of the production wafer output and the control wafer output.

4. The system as claimed in claim 3, wherein the operational efficiency is calculated as $$\text{Efficiency} = \frac{(ActualOuts + CW)/(MainRunTime + MainTestTime)}{(revTheoreticalOuts)/(MainRunTime + MainTestTime)/OpUptime)}$$

where ActualOuts is a production wafer output, CW is a control wafer throughput, MainRunTime is the time for production wafer output, MainTestTime is the time for control wafer throughput, revTheoreticalOuts is equal to a wafers per hour (WPH) value multiplied by (MainRunTime+MainTestTime), and OpUptime is the operational uptime of the tool in percent.

5. The system as claimed in claim 1, wherein the operational uptime unit further measures an operational uptime of a group of tools associated with a production process.

6. The system as claimed in claim 5, wherein the operational uptime unit determines an average of the operational uptimes of primary tools in the group of tools, determines a normalised operational uptime of an incoming backup tool in the group of tools, and calculates the operational uptime of the group of tools associated with the production process based on the average of the operational uptimes of the primary tools and the normalized uptime of the incoming backup tool.

7. The system as claimed in claim 6, wherein the operational uptime of the group of tools associated with the production process is calculated as the sum of the average of the operational uptimes of the primary tools and the normalized uptime of the backup tool.

8. The system as claimed in claim 6, wherein the normalized operational uptime of the incoming backup tool is calculated by dividing a measured operational uptime of the incoming backup tool by the number of primary tools in the group of tools.

9. The system as claimed in claim 5, wherein the operational uptime unit determines an average of the operational uptimes of remaining primary tools in the group of tools, determines a normalized operational uptime of one primary tool of the group which is outgoing as a backup tool for another production process, and calculates the operational uptime of the group of tools associated with a production process based on the average of the operational uptimes of the primary tools and the normalized uptime of said one primary tool.

10. The system as claimed in claim 9, wherein the operational uptime of the group of tools associated with the production process is calculated as the sum of the average of the operational uptimes of said remaining primary tools and the normalized uptime of said one tool.

11. The system as claimed in claim 9, wherein the normalized uptime of said one tool is calculated by dividing a measured operational uptime for said one tool by the number of said remaining primary tools in the group.

12. A method of measuring tool performance of a multi-path cluster semiconductor fabrication tool, the method comprising the steps of:
determining up or down status data for each element of the tool for respective operational time periods;
assigning a performance value to the tool for each time period based on the status data of the elements during said each time period;
determining an operational uptime for a period covering the time periods of the tool based on multiplying the respective time periods with the corresponding assigned performance values; and
applying the determined operational uptime in selecting operational parameters, production parameters, or both, of a semiconductor production plant.

13. The method as claimed in claim 12, wherein the performance value for at least one time period differs from n*100% divided by the number of process paths of the tool, where n=0,1,2, . . . .

14. The method as claimed in claim 12, further comprising the step of measuring an operational efficiency associated with the tool, the step of measuring the operational efficiency comprising:
determining production wafer output over said time periods;
determining a control wafer output over a test time period preceding or following said time periods; and
measuring the operational efficiency based on a sum of the production wafer output and the control wafer output.

15. The method as claimed in claim 14, wherein the operational efficiency is calculated as $$\text{Efficiency} = \frac{(ActualOuts + CW)/(MainRunTime + MainTestTime)}{(revTheoreticalOuts)/(MainRunTime + MainTestTime)/OpUptime)}$$

where ActualOuts is a production wafer output, CW is a control wafer throughput, MainRunTime is the time for production wafer output, MainTestTime is the time for control wafer throughput, revTheoreticalOuts is equal to a wafers per hour (WPH) value multiplied by (MainRunTime+MainTestTime), and OpUptime is the operational uptime of the tool in percent.

16. The method as claimed in claim 12, further comprising the step measuring an operational uptime of a group of tools associated with a production process.

17. The method as claimed in claim 16, wherein the step of measuring the operational uptime of the group of tools comprises:
determining an average uptime of the operational uptimes of primary tools in the group of tools;
determining a normalised operational uptime of an incoming backup tool in the group of tools; and
calculating the operational uptime of the group of tools associated with the production process based on the average of the operational uptimes of the primary tools and the normalized uptime of the incoming backup tool.

18. The method as claimed in claim 17, wherein the operational uptime of the group of tools associated with the production process is calculated as the sum of the average of the operational uptimes of the primary tools and the normalized uptime of the backup tool.

19. The method as claimed in claim 17, wherein the normalized operational uptime of the incoming backup tool is calculated by dividing a measured operational uptime of the incoming backup tool by the number of primary tools in the group of tools.

20. The method as claimed in claim 16, wherein the step of measuring the operational uptime of the group of tools comprises:
determining an average uptime of the operational uptimes of remaining primary tools in the group of tools;
determining a normalized operational uptime of one primary tool of the group which is outgoing as a backup tool for another production process;
and calculating the operational uptime of the group of tools associated with a production process based on the average of the operational uptimes of the primary tools and the normalized uptime of said one primary tool.

21. The method as claimed in claim 20, wherein the operational uptime of the group of tools associated with the production process is calculated as the sum of the average of the operational uptimes of said remaining primary tools and the normalized uptime of said one tool.

22. The method as claimed in claim 20, wherein the normalized uptime of said one tool is calculated by dividing a measured operational uptime for said one tool by the number of said remaining primary tools in the group.

23. A data storage medium comprising computer code means for instructing a computer to execute a method of measuring tool performance of a multi-path cluster semiconductor fabrication tool, the method comprising the steps of:
determining up or down status data for each element of the tool for respective operational time periods;
assigning a performance value to the tool for each time period based on the status data of the elements during said each time period;
determining an operational uptime for a period covering the time periods of the tool based on multiplying the respective time periods with the corresponding assigned performance values; and
applying the determined operational uptime in selecting operational parameters, production parameters, or both, of a semiconductor production plant.

* * * * *